(12) United States Patent
Saumya et al.

(10) Patent No.: US 12,524,451 B1
(45) Date of Patent: Jan. 13, 2026

(54) SYSTEMS AND METHODS FOR DATA INTEGRATION

(71) Applicant: Schlumberger Technology Corporation, Sugar Land, TX (US)

(72) Inventors: Sachit Saumya, Clamart (FR); Mehdi Paydayesh, Crawley (GB); Dushyant Singh Shekhawat, Crawley (GB); Supriya Gupta, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/906,194

(22) Filed: Oct. 4, 2024

(51) Int. Cl.
*G06F 16/30* (2019.01)
*G06F 16/23* (2019.01)
*G06F 16/332* (2019.01)
*G06F 16/334* (2025.01)

(52) U.S. Cl.
CPC .......... *G06F 16/3347* (2019.01); *G06F 16/23* (2019.01); *G06F 16/3328* (2019.01)

(58) Field of Classification Search
CPC ............... G06F 16/3347; G06F 16/23; G06F 16/3328
See application file for complete search history.

(56) References Cited

U.S. PATENT DOCUMENTS

| | | | |
|---|---|---|---|
| 10,943,072 B1 | 3/2021 | Jaganmohan | |
| 12,248,467 B1* | 3/2025 | Pendar | G06F 16/243 |
| 2009/0187581 A1* | 7/2009 | Delisle | G06F 16/21 |
| 2018/0341630 A1* | 11/2018 | DeVries | G06F 40/14 |
| 2021/0248153 A1* | 8/2021 | Sirangimoorthy | G06F 16/258 |
| 2021/0248303 A1* | 8/2021 | Sirangimoorthy | G06F 40/106 |
| 2022/0292143 A1* | 9/2022 | Mehta | G06F 16/953 |
| 2025/0117417 A1* | 4/2025 | Aghajanyan | G06F 16/3344 |

FOREIGN PATENT DOCUMENTS

| | | | |
|---|---|---|---|
| CN | 118939655 A | * | 11/2024 |
| WO | 2024130215 A1 | | 6/2024 |

OTHER PUBLICATIONS

Machine Translation of CN118939655A issued to Chen, filed on Jul. 22, 2024 (Year: 2024).*
Article entitled "A Hybrid AI Tool to Extract Key Performance Indicators from Financial Reports for Benchmarking", by Brito et al., dated 2019 (Year: 2019).*

(Continued)

*Primary Examiner* — Mahesh H Dwivedi
(74) *Attorney, Agent, or Firm* — Jeffrey D. Frantz

(57) ABSTRACT

A method includes receiving, via a processing system, unstructured data associated with one or more operations performed in a production system, extracting, via the processing system, information from the unstructured data based on one or more domain specific prompts associated with the production system. The method also includes integrating, via the processing system, the information with structured data to generate updated structured data, receiving, via the processing system, a request associated with the one or more operations, and generating, via the processing system, a response based on the updated structured data, wherein the response includes a visualization representative of the response.

20 Claims, 6 Drawing Sheets

(56) References Cited

OTHER PUBLICATIONS

Sircar, A. et al., "Application of machine learning and artificial intelligence in oil and gas industry", Petroleum Research, 2001,6(4), pp. 379-391.
Doan, A., et al., "The Case for a Structured Approach to Managing Unstructured Data", CIDR Perspectives, 2009, 6 pages.
Guan, S. et al., "Advancing Post-OCR Correction: A Comparative Study of Synthetic Data", In: Ku, L.-W., Martins, A., and Srikumar, V. (eds.), Findings of the Association for Computational Linguistics: ACL 2024, Bangkok, Thailand, Aug. 2024, pp. 6036-6047.

* cited by examiner

CHAT INTERFACE

QUESTION:
WHAT KIND OF WELL CLEANING METHODS WERE USED?

RAG ANSWER:
BASED ON THE WELL INTERVENTION REPORT, THE WELL CLEANING METHODS USED DURING THE WORKOVER OPERATION INCLUDE:

- RUNNING IN THE HOLE (RIH) WITH SCRAPER AND BRUSH TOOLS TO CLEAN THE CASING.
- CIRCULATING THE WELLBORE WITH CLEAN 20 PPT BRINE TO REMOVE DEBRIS.
- CONDUCTING CIRCULATION TESTS TO ENSURE THE WELLBORE WAS CLEAN.
- PULLING OUT OF HOLE (POOH) WITH THE TAG TOOL TO CLEAN THE WELLBORE WITH BRINE AND REMOVE ANY RESIDUAL CEMENT.

THESE METHODS WERE EMPLOYED TO ENSURE THAT THE WELLBORE WAS THOROUGHLY CLEANED DURING THE WORKOVER OPERATION.

SOURCES:
*file = /WELL INTERVENTION REPORT

TYPE YOUR QUESTION

FIG. 6

SYSTEMS AND METHODS FOR DATA INTEGRATION

BACKGROUND

The present disclosure generally relates to systems and methods for enhanced data analysis of production processes by generating a unified tabular database and an enriched knowledge bank.

During production operations, operators, engineers, and other personnel may make frequent interventions or changes to operations of various devices to maintain and improve production efficiency of the respective production operations. These interventions may generate large amounts of unstructured data (e.g., logs, reports, sensor outputs) related to the changes that are implemented, the effects of those changes, characteristics of the equipment, and the like. Additionally, significant computational or user effort may be involved to review and/or process both the unstructured and structured data. As a result, handling the unstructured and structured data may be inefficient and susceptible to errors.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a method includes receiving, via a processing system, unstructured data associated with one or more operations performed in a production system, extracting, via the processing system, information from the unstructured data based on one or more domain specific prompts associated with the production system. The method also includes integrating, via the processing system, the information with structured data to generate updated structured data, receiving, via the processing system, a request associated with the one or more operations, and generating, via the processing system, a response based on the updated structured data, wherein the response includes a visualization representative of the response.

In an embodiment, a system includes a data source including unstructured data associated with one or more operations performed in a production system and processing circuitry configured to extract information from the unstructured data based on one or more domain specific prompts associated with the production system. The processing circuitry is also configured to integrate the information with structured data to generate updated structured data, receive a request associated with the one or more operations, and generate a response based on the updated structured data, wherein the response includes a visualization representative of the response.

In an embodiment, a tangible, non-transitory, computer-readable medium comprising instructions that, when executed by processing circuitry, are configured to cause the processing circuitry to receive unstructured data associated with one or more operations performed in a production system, extract information from the unstructured data based on one or more domain specific prompts associated with the production system. The instructions, when executed by the processing circuitry, are also configured to cause the processing circuitry to integrate the information with structured data to generate updated structured data, receive a request associated with the one or more operations, and generate a response based on the updated structured data, wherein the response includes a visualization representative of the response Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 6 is an example illustration of a chat interface generated by the AI system of FIG. 1 based on the knowledge bank, in accordance with embodiments of the present disclosure.

DETAILED DESCRIPTION

Figure 1:
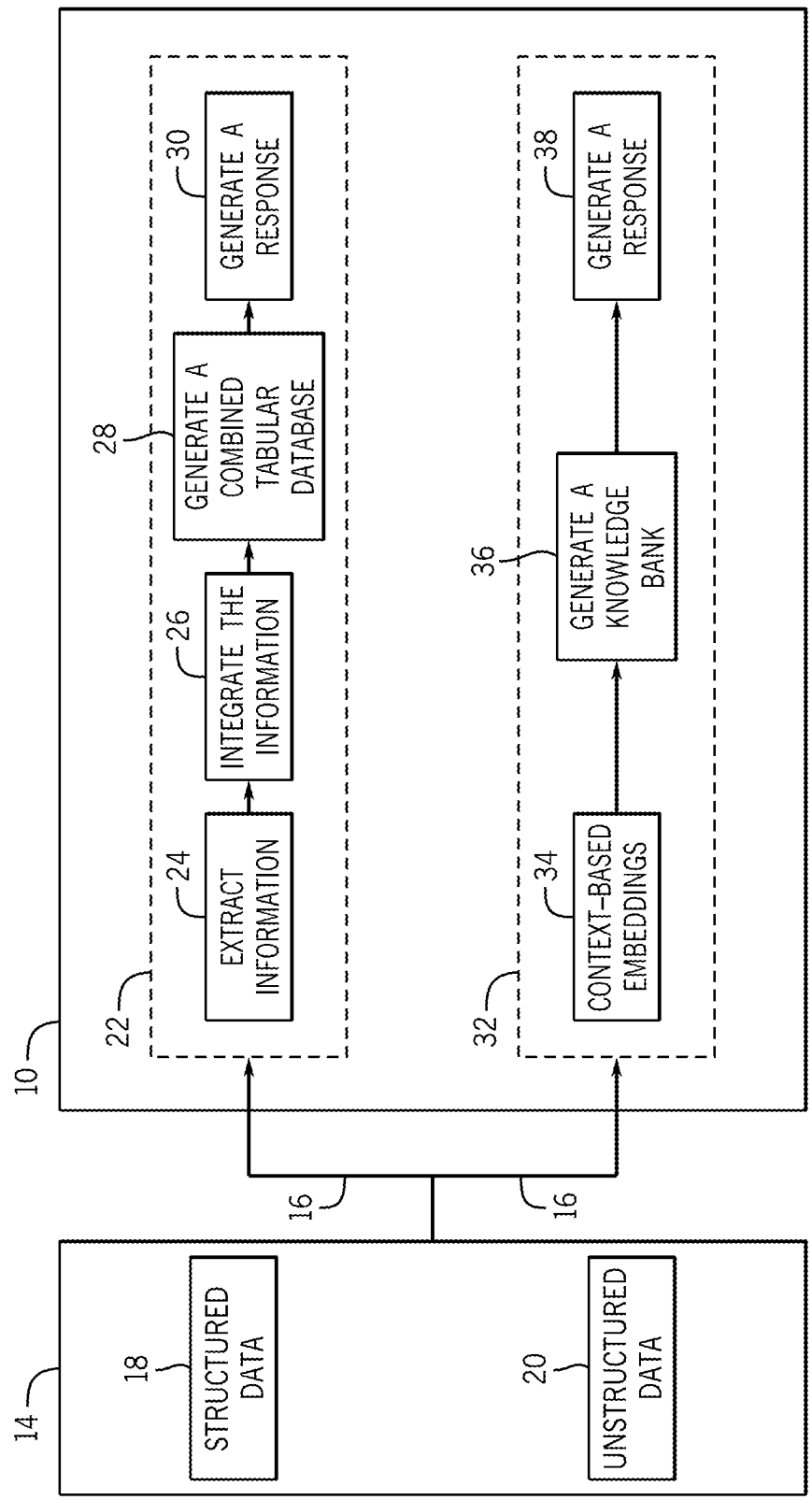
FIG. 1 is a flow diagram of processes performed in an artificial intelligence (AI) system, in accordance with embodiments of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection (e.g., where the connection may not include or include intermediate or intervening components between those coupled), and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

In the course of production operations, personnel, such as operators, engineers, or involved staff, may frequently make interventions or adjustments to various devices to improve efficiency of production processes. These interventions may generate substantial amounts of unstructured data related to the changes implemented, the effects of those changes, characteristics of the equipment, and the like. Further, the unstructured data may be integrated with structured data to get a better or holistic understanding of the production operations. However, reviewing, integrating, and/or managing the unstructured data along with structured data may be challenging and inefficient, resulting in errors.

Embodiments of the present disclosure are generally directed to an artificial intelligence (AI) system that may integrate unstructured data (e.g., unstructured datasets) with structured data (e.g., structured datasets) to enable the AI system to more accurately and efficiently generate responses to user queries (e.g., prompts, questions). As an example, the unstructured data may include data from various sources, such as intervention reports, production reports, event history reports, work orders, and the like. The structured data, on the other hand, may be received (e.g., retrieved) from a database and may include historical time series data and/or trends associated with production. Therefore, the structured data may be organized into different categories, columns, sections, and the like, such that the information may be retrieved by the AI system in an interpretable format. As will be described in further detail below, the AI system may perform advanced data analysis by generating and employing a combined (e.g., enhanced, enriched) tabular database and/or a knowledge bank (e.g., vector database).

Indeed, in an embodiment, the AI system may retrieve domain specific prompts for extracting information (e.g., insights, summaries) from the unstructured data to provide key performance indicators (KPIs) using generative AI. The domain specific prompts may be generated by one or more users via prompt engineering, but it should be noted that the AI system may generate the prompts based on a prompt design, artificial intelligence (AI) input design and the like.

In some embodiments, the AI system may present the prompts via a graphical user interface (GUI), such that a user may customize or modify the prompts employed by the AI system to extract the relevant information from the unstructured datasets. In any case, after identifying the relevant information from the unstructured data, the AI system may integrate (e.g., associate) the information (e.g., the indicators, the insights, and/or the summaries) with the structured data to generate the combined tabular database that includes structured tabular data.

Indeed, the combined tabular database may include the integration of the structured data with the extracted information from the unstructured data. The AI system may then employ the combined tabular database to generate responses to user requests, such as visualizations (e.g., charts, graphs, reports) for efficient interpretation and decision-making by any suitable user, instructions for improving production outcomes, and the like. In this manner, the AI system may generate the combined tabular database to provide key visual capabilities and enable the informed decision-making and/or operation planning. Moreover, the AI system may generate the combined tabular database to ensure that the relevant information is no longer in an unstructured free-text format, and instead, is linked with the structured data (e.g., time-series production data).

In another embodiment, the AI system may employ generative AI (e.g., retrieval-augmented generation (RAG), AI model) to convert text and/or categorical data of the structured data and the unstructured data into context-based embeddings, which are dense vectors of real numbers that represent categorical variables, such as words, phrases, and/or documents in a vector space. Further, the AI system may generate the knowledge bank, which includes the context-based embeddings. As an example, each text of each word of a particular report (e.g., in the structured data or the unstructured data) may be included in the knowledge bank through the context-based embeddings. Further, the context-based embeddings may represent relationships and/or similarities between data points of the unstructured data and the structured data. For example, the AI system may employ models (e.g., neural network models) and/or algorithms to map the data to the vectors in the vector space, where distance and direction between vectors may represent the relationships and/or similarities.

Additionally, the AI system may provide a chat interface (e.g., using AI), which may enable users to input a query (e.g., via text and/or voice). Further, the AI system may compare the query to the context-based embeddings to identify (e.g., find) text and/or documents relevant to the query. In this manner, the AI system may generate the knowledge bank to enable any suitable user to interact with vast amounts of data in an efficient manner, enabling improved insights and decision-making. Accordingly, embodiments described herein may enable in-depth analysis of intervention impacts and improve decision-making, intervention planning, and/or efficiency by employing interactive AI assistance to generate the combined tabular database and/or the knowledge bank.

With the foregoing in mind, FIG. 1 is a flow diagram of processes performed in an artificial intelligence (AI) system 10. In some embodiments, the AI system 10 may include a communication component, a processor, a memory, a storage, input/output (I/O) ports, a display, and the like. The communication component may be a wireless or wired communication component that may facilitate communication between the AI system 10 and any other suitable communication capable devices.

The processor may be any type of computer processor or microprocessor capable of executing computer-executable code. The processor may also include multiple processors, processing circuitry, or a processing system that may perform the operations described below. The memory and the storage may be any suitable articles of manufacture that can serve as media to store processor-executable code, data, or the like. These articles of manufacture may represent computer-readable media (e.g., any suitable form of memory or storage) that may store the processor-executable code used by the processor to perform the presently disclosed techniques. In an embodiment, the processor of the AI system 10 may operate in conjunction with a deep-learning processor or a neural-network processor and/or, for example, the processor may include machine learning and/or AI-based processors.

The memory and the storage may also be used to store data, analysis of the data, software applications, and the like. The memory and the storage may represent non-transitory computer-readable media (e.g., any suitable form of memory or storage) that may store the processor-executable code used by the processor to perform various techniques described herein. It should be noted that non-transitory merely indicates that the media is tangible and not a signal. In one embodiment, the memory and/or storage may include a software application that may be executed by the processor and may be used to monitor, control, access, or view various devices involved in production processes. As such, the AI system 10 may communicatively couple to the various devices via a direct connection to the devices, via a cloud-based computing system, or the like.

The I/O ports may be interfaces that may couple to other peripheral components such as input devices (e.g., keyboard, mouse), sensors, input/output (I/O) modules, and the like. I/O modules may enable the AI system 10 to communicate with the various devices involved in the production processes. The display may depict visualizations associated with software or executable code being processed by the processor. In one embodiment, the display may be a touch display capable of receiving inputs from a user of the AI system 10. As such, the display may serve as a user interface to provide parameters and instructions to guide the operation of the AI system 10. The display may be used to display a graphical user interface (GUI) for operating the AI system 10. The display may be any suitable type of display, such as a liquid crystal display (LCD), plasma display, or an organic light emitting diode (OLED) display, for example. Additionally, in one embodiment, the display may be provided in conjunction with a touch-sensitive mechanism (e.g., a touch screen) that may function as part of a control interface for the AI system 10 to control the general operations of the various devices involved in the production processes.

In an embodiment, the generative AI component may be integrated into the AI system 10 (or remotely coupled thereto) and can operate as a component that utilizes algorithms and/or models interconnected with other components of the AI system 10. In some embodiments, the generative AI component may function separately (e.g., independently) from the AI system 10. Further, the generative AI component may be coupled to the AI system 10 via a cloud (e.g., a cloud-based integration) enabling utilization of the algorithms and/or the models hosted remotely on the cloud. It should be noted that the AI system 10 may perform at least some of the processes described herein in parallel (e.g., simultaneously) or at separate times.

The AI system 10 may be coupled to a data source 14 and may receive (process 16) (e.g., retrieve) structured data 18 (e.g., structured datasets) and unstructured data 20 (e.g., unstructured datasets) from a data source 14. The data source 14 may be a Structured Query Language (SQL) database, a cloud database, a server, and the like. As an example, the structured data 18 may be retrieved from a database and may include historical time-series data and/or trends associated with production. Therefore, the structured data 18 may be organized in a defined format, such as in different categories, rows, columns, sections, and the like, such that the information may be retrieved by the AI system 10 is in an interpretable format. As another example, the unstructured data 20 may include data from various sources, such as intervention reports, production reports, event history reports, work orders, and the like. Moreover, the unstructured data 20 may lack a pre-defined format (e.g., structure), for example, the unstructured data 20 may be in a free-text format.

With the foregoing in mind, in some embodiments, the AI system 10 may extract information from unstructured data to incorporate the unstructured data with the structured data, such that the enhanced or combined dataset may be used to generate responses to various inquiries. By way of example, a first process 22 illustrates an example overview process for extracting information from unstructured data in accordance with embodiments herein. Referring now to the first process 22 of FIG. 1, at block 24, the AI system 10 may extract information (e.g., relevant information) from the unstructured data 20. Indeed, the AI system 10 may retrieve domain specific prompts for extracting the information (e.g., key performance indicators (KPIs), insights, summaries) from the unstructured data 20 using generative AI. The domain specific prompts may be generated by one or more users via prompt engineering, but it should be noted that the AI system 10 may generate the domain specific prompts based on a prompt design, an AI input design, and the like. At block 26, the AI system 10 may integrate (e.g., associate, combine) the extracted information with the structured data 18 to generate combined (e.g., unified, enhanced, enriched, updated) structured data. For example, the AI system 10 may integrate the information with the structured data 18 in a tabular format. In this manner, the AI system 10 may enhance the structured data 18 with the extracted information from the unstructured data 20 to create a more comprehensive dataset.

At block 28, the AI system 10 may generate a combined tabular database that includes the combined structured data. In an embodiment, the AI system 10 may receive a request for information related to the structured data 18 and/or the unstructured data 20. Thus, at block 30, the AI system 10 may generate a response to the request based on the combined tabular database. For example, the AI system 10 may identify columns and/or data points that are relevant to the request in the combined tabular database. Moreover, the AI system 10 may aggregate or transform the data relevant to the request. In this manner, the AI system 10 may generate and present a visualization based on the data relevant to the request stored in the combined tabular database. For example, the AI system 10 may generate a visualization including a bar chart, a line graph, a pie chart, and the like. Additional details regarding the first process 22 will be described below with respect to FIG. 2

In addition to integrating unstructured data with the structured data as described above with reference to the process 22, the AI system 10 may generate or update a knowledge bank with context-based embeddings related to the unstructured data 20 and the structured data 18 as generally described below with reference to a second process 32. As described herein, the AI system 10 may be coupled to the data source 14 and may receive (process 16) the structured data 18 and the unstructured data 20 from the data source 14. During the second process 32, at block 34, the AI system 10 may employ retrieval-augmented generation (RAG) or any suitable AI model to convert text and/or categorical data of the structured data 18 and the unstructured data 20 into context-based embeddings, which are dense vectors of real numbers that represent categorical variables, such as words, phrases, and/or documents in a vector space.

Additionally, at block 36, the AI system 10 may generate a knowledge bank (e.g., vector database), which includes the context-based embeddings. As an example, each text of each word of a particular report (e.g., in the structured data or the unstructured data) may be included in the knowledge bank through the context-based embeddings. Further, the context-based embeddings may represent relationships and/or similarities between data points of the unstructured data and the structured data. For example, the AI system 10 may employ models (e.g., neural network models) and/or algorithms to map the data to the vectors in the vector space, where distance and direction between vectors may represent the relationships and/or similarities.

In some embodiments, the AI system 10 may provide a chat interface (e.g., using AI), which may enable users to input a query (e.g., via text and/or voice). Therefore, at block 38, the AI system 10 may receive the query and generate a response to the query based on the knowledge bank. For example, the AI system 10 may retrieve the response based on the context-based embeddings stored in the knowledge bank. Indeed, the AI system 10 may identify and provide the response based on the context-based embeddings most closely related to the query according to the distances in the vector space. For example, the AI system 10 may compare the query to the context-based embeddings of a report to identify and retrieve the most relevant sections of the report to the query. As such, embodiments described herein may enable in-depth analysis of intervention impacts and improve decision-making, intervention planning, and/or efficiency by employing interactive AI assistance. Additional details regarding the second process 32 will be described below with respect to FIG. 3.

Figure 2:
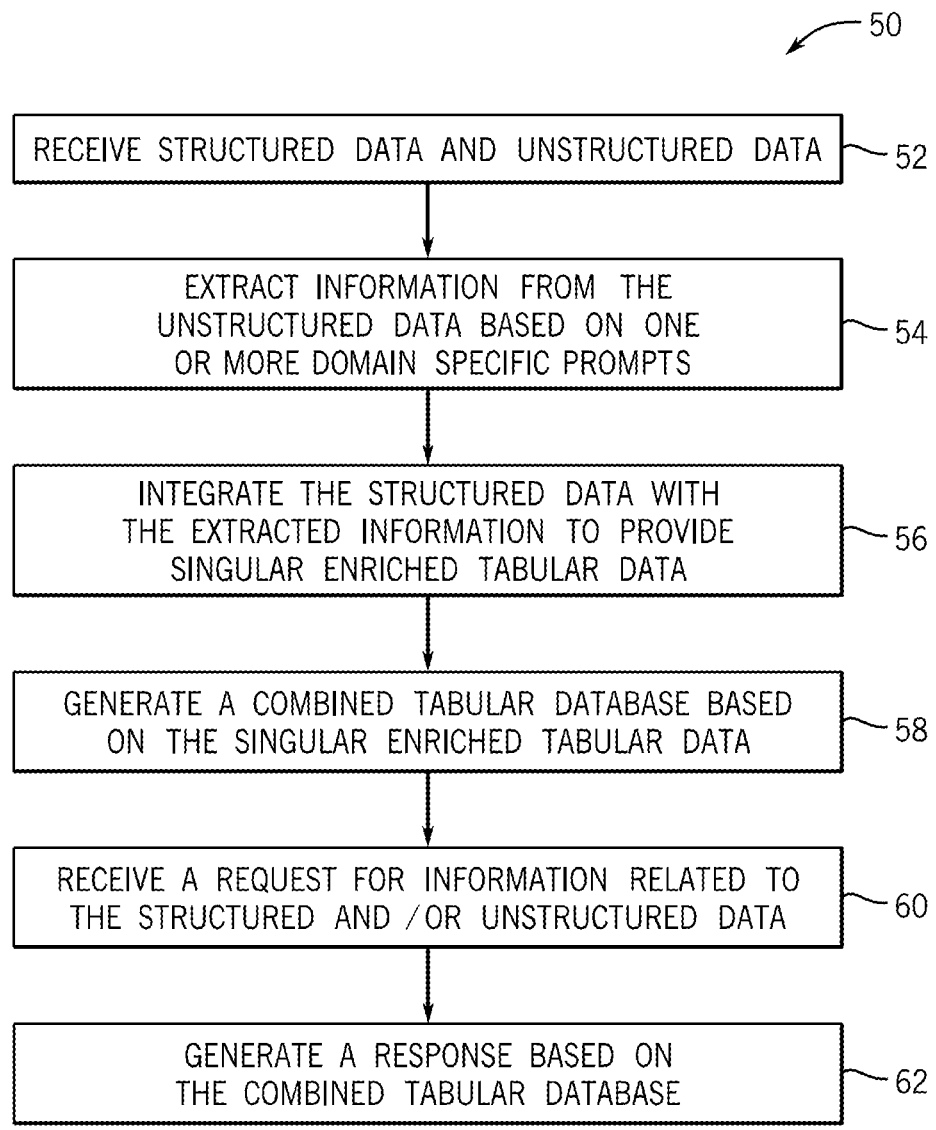
FIG. 2 is a flowchart of a method for the AI system of FIG. 1 to generate a response based on a combined tabular database, in accordance with embodiments of the present disclosure.

FIG. 2 is a flowchart of a method 50 for the AI system 10 of FIG. 1 to generate a response based on the combined tabular database. It should be noted that one or more blocks of the method 50 may be performed by the processing circuitry of the AI system 10 in any suitable order and/or in parallel. Further, although the following description of FIG. 2 is discussed as being performed by the AI system 10, it should be understood that any suitable component may perform the method 50 in any suitable order. For example, the method 50 may be performed by an external computing system or device.

At process block 52, the AI system 10 may receive the structured data 18 and the unstructured data 20. The structured data 18 may include historical time-series data and/or trends associated with production. For example, the structured data 18 may include historical data and/or daily data related to well and fluid rates. Moreover, the structured data 18 may be formatted in a manner for efficient searchability and/or retrieval by the AI system 10, such as in rows and columns with labels (e.g., dates, names, or categories) for its contents. The unstructured data 20 may include data (e.g., Portable Document Formats (PDFs), images, schematics, free-text, and the like) from various sources, such as any suitable report or work order. Further, the unstructured data 20 may include data in any suitable language (e.g., 5 or more languages, 12 or more languages, 20 or more languages). The unstructured data 20 may not have a pre-defined format or structure, which may make processing and/or retrieval by the AI system 10 more complex. Indeed, the unstructured data 20 may include large (e.g., vast) amounts of uninterpreted data.

As such, at process block 54, the AI system 10 may extract the information (e.g., relevant information) from the unstructured data 20 based on the domain specific prompts. That is, the AI system 10 may automatically extract KPIs (e.g., intervention KPIs) from the unstructured data 20 (e.g., unstructured intervention reports) through prompt engineering (or prompt libraries) by any suitable number of users) using generative AI. The KPIs may include quantifiable metrics that may enable the user to evaluate production processes and may provide actionable insights by measuring performance.

For example, the KPIs may include service provider names, intervention types, cost, duration, and/or summaries. Further, the domain specific prompt engineering may involve the users creating and/or refining prompts tailored to a subject or industry (e.g., production industry) to cause the AI system 10 to retrieve more relevant information, such as the KPIs or any other suitable insight and summaries, from the unstructured data 20. In an embodiment, the AI system 10 may employ automatic pattern detection between the structured data 18 and the unstructured data 20 as part of the data integration. In another embodiment, the AI system 10 may extract information from the unstructured data 20, such as multiple reports over a period of time (e.g., specified via a user input) or each report of the multiple reports at different periods of time. For example, the AI system 10 may extract information from multiple reports of a well over a period of time or over different periods of time.

At process block 56, the AI system 10 may integrate the structured data 18 with the extracted information (e.g., from the unstructured data 20). For example, the AI system 10 may integrate the structured data 18 with the KPIs extracted from a number of reports in the unstructured data 20 into the singular enriched tabular data. The singular enriched tabular data may include the structured data 18 enhanced with the extracted information from the unstructured data 20 to provide additional information or context, which may provide valuable insights to the user. Further, in an embodiment, the AI system 10 may move the extracted information into a structured table of the structured data 18. In this manner, the singular enriched tabular data may improve an understanding of and/or provide valuable insights for production operations.

At process block 58, the AI system 10 may generate the combined tabular database based on the singular enriched tabular data. Indeed, the combined tabular database may include the singular enriched tabular data. In an embodiment, the combined tabular database may be moved to a customer database or repository. At process block 60, the AI system 10 may receive a request for information related to the structured data 18 and/or the unstructured data 20. For example, the AI system 10 may receive a request for information related to interventions, such as a total of interventions, a count of intervention types, a duration of the interventions, and the like.

At process block 62, the AI system 10 may generate a response based on the combined tabular database. That is, the AI system 10 may query the combined tabular database with parameters associated with the request to retrieve relevant data to the request. The AI system 10 may then analyze and/or format the relevant data based on the request. For example, the AI system 10 may generate a number of visualizations to present to the user. The visualizations may include bar graphs, line graphs, pie charts, reports, tables, with text, labels, values (e.g., totals, averages, rates costs), titles, and/or descriptions. It should be noted that the AI system 10 may update the response, such as the visualizations, in real-time as additional data is received and/or processed. In this manner, the response may reflect up-to-date information to the user. Accordingly, the AI system 10 may provide the response to the user and provide the unstructured data 20, which is now linked to the structured data 18, in a navigable digestible format to aid in interpretation and/or decision making.

In some embodiments, the user request or query may also be associated with adjusting operations of one or devices in a production system (e.g., devices performing production processes). For example, the one or more devices may include valve assembles, wellheads, pumps, separation devices, seismic survey equipment, drilling equipment, and the like. Thus, the AI system 10 may implement a control operation to adjust or control operation of any of the one or more devices based on the request or query from the user. For example, the user may request information related to a cement setting times. The AI system 10 may provide information (e.g., generate the response) indicating that the cement set more slowly than expected. Thus, the AI system 10 may adjust operation of a pump by increasing a circulation time of drilling fluid to reduce or minimize premature cement settling.

As another example, the user may request information related to cleaning methods. The AI system 10 may provide information indicating a frequency of running scraper and brush tools running in hole. Therefore, the AI system 10 may implement a control operation to adjust the frequency of running scraper and brush tools running in hole to a higher frequency or a lower frequency. It should be noted that the AI system 10 may automatically adjust operations of the one or more devices based on the response generated and/or based on the user request or query.

Figure 3:
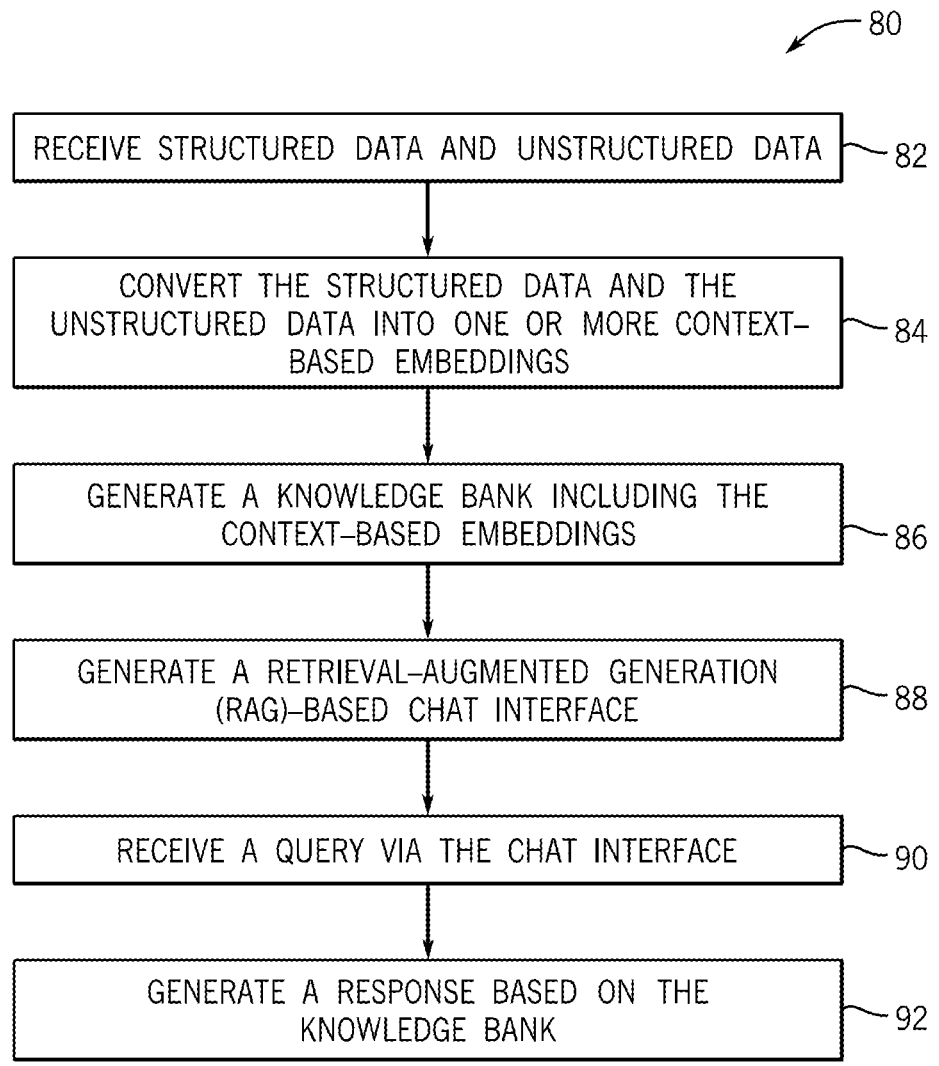
FIG. 3 is a flowchart of a method for the AI system of FIG. 1 to generate a response based on a knowledge bank, in accordance with embodiments of the present disclosure.

Additionally or alternatively, as mentioned above, in an embodiment, the AI system 10 may employ the structured data 18 and the unstructured data 20 to generate (e.g., create) the knowledge bank (e.g., vector database) consisting of contextual information that may better assist AI tools (e.g., generative AI tools) providing feedback to users in an efficient and/or interactive manner (e.g., via chatbot functionality). Indeed, FIG. 3 is a flowchart of a method 80 for the AI system 10 of FIG. 1 to generate a response based on the knowledge bank. It should be noted that one or more blocks of the method 80 may be performed by the processing circuitry of the AI system 10 in any suitable order and/or in parallel. Further, although the following description of FIG. 3 is discussed as being performed by the AI system 10, it should be understood that any suitable component may perform the method 80 in any suitable order. For example, the method 80 may be performed by an external computing system or device.

As described herein, at process block 82, the AI system 10 may receive the structured data 18 and the unstructured data 20. Further, at process block 84, the AI system 10 may convert the structured data 18 into the context-based embeddings. The context-based embeddings may include vectors representations (e.g., dense vectors) of real numbers that represent categorical variables, such as words, phrases, and/or documents in a vector space. For example, the context-based embeddings may adapt a representation of a word depending on surrounding words to provide an accurate context-sensitive understanding of data.

At process block 86, the AI system 10 may generate the knowledge bank including the context-based embeddings. As an example, each text of each word of a particular report (e.g., in the structured data 18 or the unstructured data 20) may be included in the knowledge bank through the context-based embeddings. The context-based embeddings may represent relationships and/or similarities between data points of the structured data 18 and the unstructured data 20. Additionally, the AI system 10 may employ models (e.g., neural network models) and/or algorithms to map the data to the vectors in the vector space, where distance and direction between vectors may represent the relationships and/or similarities. In an embodiment, the context-based embeddings may correspond to stored converted sections of reports (e.g., from the structured data 18 and/or the unstructured data 20) stored in the knowledge bank. Further, in an embodiment, the AI system 10 may comprehensive store all of the structured data 18 and the unstructured data 20 received from the data source 14 (e.g., in its entirety).

Additionally, at process block 88, the AI system 10 may generate the RAG-based chat interface. The RAG-based chat interface may enable users to input a query (e.g., via text and/or voice). Thus, at process block 90, the AI system 10 may receive the query via the chat interface. The query may include a request for a detailed summary for an amount of time (e.g., an amount of hours, days, months, years, and the like) of production operations, a duration for completion of a production process (e.g., an amount of time for completion of the production process), a type of production process employed, a frequency of production cycles, and the like. The AI system 10 may enable the user to interact with a portion of or all of the structured data 18 and the unstructured data 20 concurrently in the knowledge bank via the chat interface. As an example, the user may input the query, which includes a request for types of cleaning methods used to clean a well.

At process block 92, the AI system 10 may generate a response based on the knowledge bank. Indeed, the AI system 10 may send the query to a large language model (LLM) that has been trained on various (e.g., millions, billions, trillions) parameters and refers to the knowledge bank (e.g., including the context-based embeddings). The AI system 10 may then generate the response based on the data stored in the knowledge bank. For example, the AI system 10 may include the context-based embeddings, which may correspond to stored converted sections of a well intervention report in the knowledge bank. The context-based embeddings may be associated with data indicating the well cleaning methods used, such as running in hole with scraper and brush tools and conducting circulation tests to ensure the well was clean. In this manner, the AI system 10 may provide the response including the data indicating the well cleaning methods used based on the user query.

As another example, the AI system 10 may compare the query to the context-based embeddings to identify (e.g., find) text and/or documents relevant to the query. In this manner, the RAG-based chat interface may enable the AI system 10 to generate the response based on the structured data 18 and the unstructured data 20 in the knowledge bank. As such, embodiments described herein may enable in-depth analysis of intervention impacts and improve decision-making, intervention planning, and/or efficiency by employing interactive AI assistance in the AI system 10.

Figure 4:
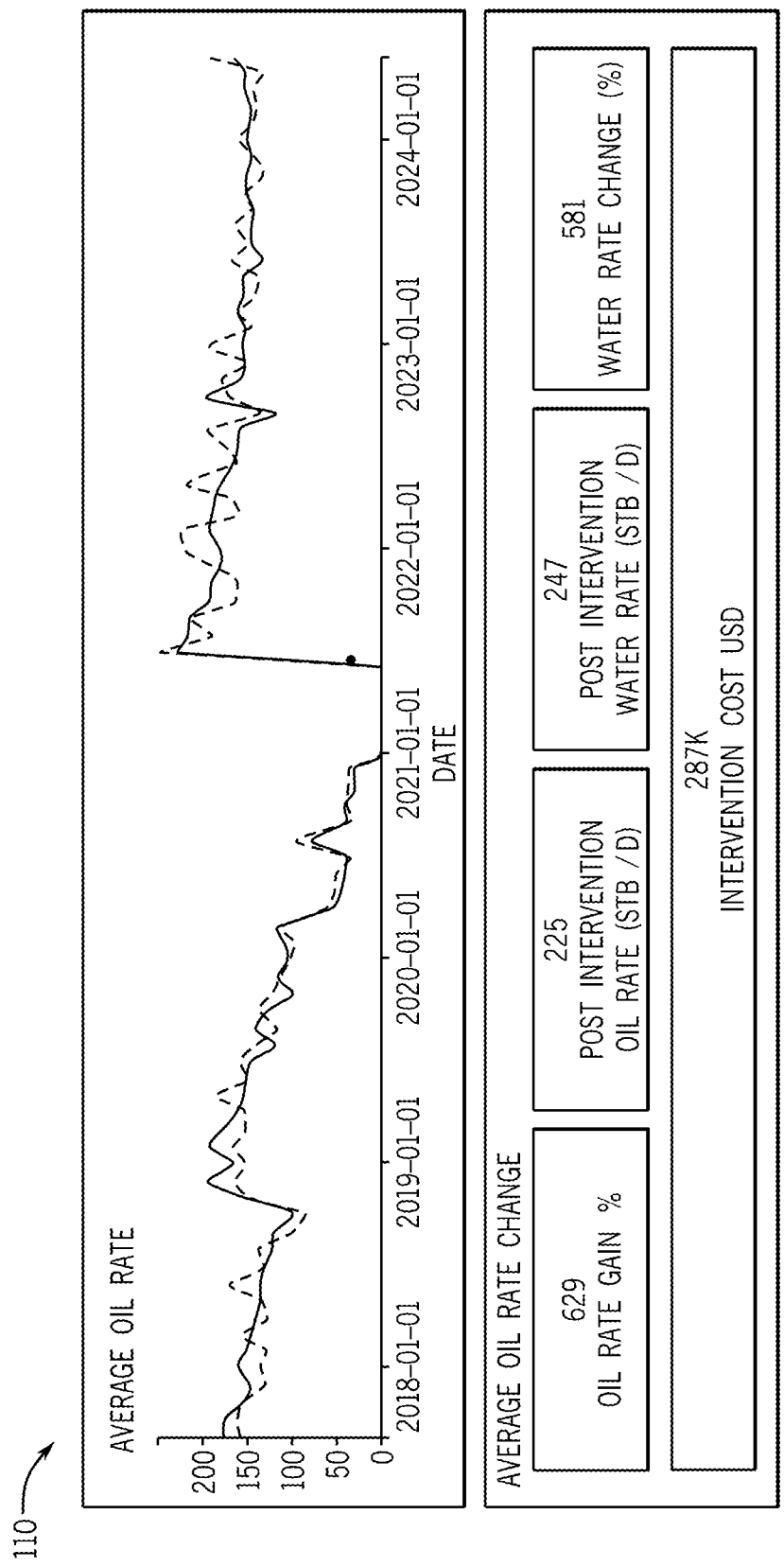
FIG. 4 is an example illustration of a first visualization generated by the AI system of FIG. 1 based on the combined tabular database, in accordance with embodiments of the present disclosure.

FIG. 4 is an example illustration of a first visualization 110 generated by the AI system of FIG. 1 based on the combined tabular database. That is, the AI system 10 may generate the first visualization 110 by retrieving information from the combined tabular database (e.g., the singular enriched tabular data) based on the request for information by the user. For example, the user may request information related to an average oil rate over a period of time. Therefore, as illustrated in FIG. 4, the first visualization 110 may include a line graph illustrating the average oil rate over the period time (e.g., over 6 years). It should be noted that the period of time may include any suitable period of time, such as days, weeks, months, years, and the like.

Further, the first visualization 110 may include additional information to enable the user to perform intervention analysis. For example, the first visualization 110 may include an oil rate gain (e.g., 629%), a post intervention oil rate (e.g., 225), an intervention cost (e.g., $287,000), and a water rate change (e.g., 581%). As such, the first visualization 110 may provide the information to the user based on the combined tabular database for efficient interpretation and/or decision-making by the user. Indeed, the AI system 10 may present the first visualization 110 to the user to enable the user to visualize the singular enriched tabular data (e.g., the KPIs, summaries, and insights).

Figure 5:
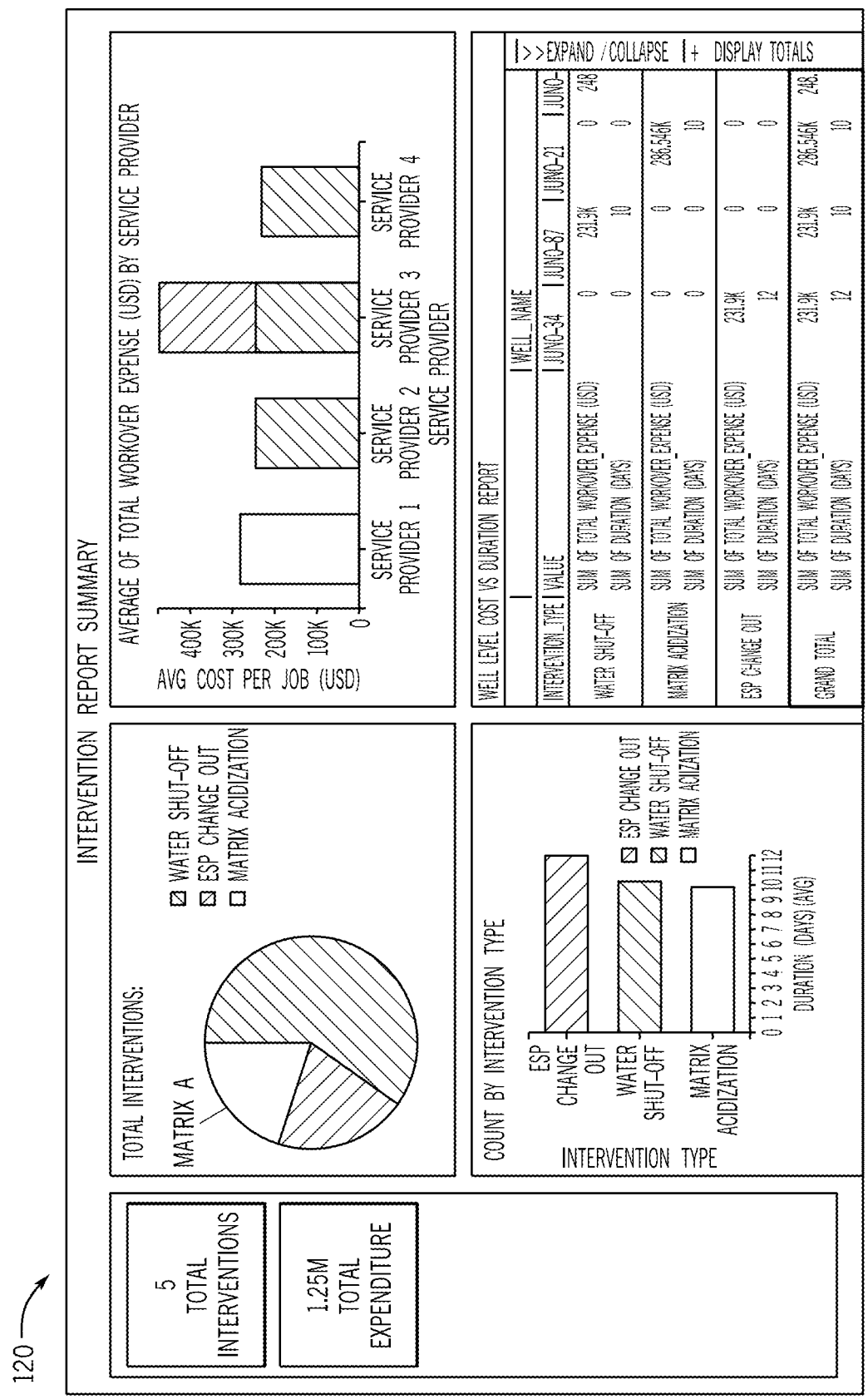
FIG. 5 is an example illustration of a second visualization generated by the AI system of FIG. 1 based on the combined tabular database, in accordance with embodiments of the present disclosure.

FIG. 5 is an example illustration of a second visualization 120 generated by the AI system 10 of FIG. 1 based on the combined tabular database. For example, as illustrated the second visualization 120 may include an intervention report summary. The intervention report summary include several types of information such as total interventions (e.g., as a pie chart), count by intervention type (e.g., as a horizontal bar graph), a well level cost versus duration (e.g., as a table), an average of total workover expense by service providers (e.g., as a vertical bar graph). Further, the intervention report summary may include information such as a total number of interventions (e.g., 5) and a total expenditure (e.g., $1,250,000). As such, the AI system 10 may present the second visualization 120 to the user to enable the user to visualize intervention report summaries to enable in-depth analysis of intervention impacts, improve decision-making, and/or intervention planning.

As described herein, the AI system 10 may generate and present a chat interface 130 (e.g., the RAG-based chat interface). Therefore, FIG. 6 is an example illustration of the chat interface 130 generated by the AI system 10 of FIG. 1 based on the knowledge bank. As illustrated, the chat interface may enable the user to input the query. For example, as illustrated in FIG. 6, the query may include a request for types of well cleaning methods used. The AI system 10 may retrieve information relevant to the query (e.g., based on context-based embeddings in the knowledge bank) and provide the response to the user in the chat interface 130. For example, as illustrated in FIG. 6, the response may include the types of well cleaning methods used during a workover operation. Further, the AI system 10 may also provide a source for the response provided to the user in response to the query. Indeed, as shown in FIG. 6, the source for the well cleaning methods presented may be retrieved from a well intervention report.

The technical effect of the disclosed embodiments includes employing the generative AI to automate KPI extraction, perform advanced data analysis using interactive AI assistance, and integrate the structured data 18 (e.g., structured production data) with the unstructured data 20 (e.g., unstructured intervention event reports). Indeed, the extraction of insights from the unstructured data 20 may provide valuable KPIs and operational information, and integration with the structured data 18 may enable a better understanding of production operations. Thus, the AI system 10 may perform an in-depth analysis of intervention impacts and/or offer a comprehensive visualization of the intervention impacts. Additionally, the AI system 10 may use the structured data 18 and the unstructured data 20 to create the knowledge bank (e.g., the vector database) consisting of contextual information that may better assist generative AI tools in providing feedback to users in an efficient and interactive manner. Therefore, the AI system 10 may enable improved decision-making, efficient intervention planning, and/or efficient interaction with large amounts of data by employing interactive AI assistance.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:
   receiving, via a processing system, unstructured data associated with one or more production operations performed in an oil and gas production system;
   extracting, via the processing system, information from the unstructured data based on one or more domain specific prompts associated with the oil and gas production system, wherein the information provides intervention key performance indicators (KPIs) and context extracted from intervention reports;
   integrating, via the processing system, the information with structured data to generate updated structured data, wherein the updated structured data is enhanced with the information and the context by adding the information and the context into the structured data;
   receiving, via the processing system, a request associated with the one or more production operations of the oil and gas production system;
   generating, via the processing system, a response based on the updated structured data, wherein the response comprises a visualization representative of the response; and
   based on the request and the generated response, automatically adjusting one or more operational parameters of one or more devices of the oil and gas production system to control the one or more production operations.

2. The method of claim 1, wherein the one or more devices include one or more of a valve assembly, a wellhead, a pump, a separation device, seismic survey equipment, drilling equipment, a scraper tool, or a brush tool of the oil and gas production system.

3. The method of claim 1, wherein the one or more domain specific prompts are based on at least one of a prompt design, an input received via an artificial intelligence design, or an additional input received from a user.

4. The method of claim 1, wherein the structured data comprises a tabular format.

5. The method of claim 1, comprising converting, via the processing system, one or more datasets associated with the structured data and the unstructured data into one or more context-based embeddings based on an artificial intelligence model.

6. The method of claim 5, wherein the artificial intelligence model comprises a retrieval-augmented generation (RAG) artificial intelligence model.

7. The method of claim 5, comprising generating, via the processing system, a vector database based on the one or more context-based embeddings.

8. The method of claim 7, comprising generating, via the processing system, the response based on the vector database.

9. The method of claim 7, wherein the vector database comprises one or more vectors in a vector space associated with mapping the one or more context-based embeddings.

10. The method of claim 9, wherein the one or more context-based embeddings are mapped based on a neural network model.

11. A system comprising:
a data source comprising unstructured data associated with one or more production operations performed in an oil and gas production system; and
processing circuitry configured to:
extract information from the unstructured data based on one or more domain specific prompts associated with the oil and gas production system, wherein the information provides intervention key performance indicators (KPIs) and context extracted from intervention reports;
integrate the information with structured data to generate updated structured data, wherein the updated structured data is enhanced with the information and the context by adding the information and the context into the structured data;
receive a request associated with the one or more production operations of the oil and gas production system;
generate a response based on the updated structured data, wherein the response comprises a visualization representative of the response; and
based on the request and the generated response, automatically adjust, with the processing circuitry, one or more operational parameters of one or more devices of the oil and gas production system to control the one or more production operations.

12. The system of claim 11, wherein the one or more devices include one or more of a valve assembly, a wellhead, a pump, a separation device, seismic survey equipment, drilling equipment, a scraper tool, or a brush tool of the oil and gas production system.

13. The system of claim 11, wherein the processing circuitry is configured to convert one or more datasets associated with the structured data and the unstructured data into one or more context-based embeddings based on an artificial intelligence model.

14. The system of claim 13, wherein the processing circuitry is configured to:
generate a vector database based on the one or more context-based embeddings; and
generate the response based on the vector database.

15. The system of claim 14, wherein the vector database comprises one or more vectors in a vector space associated with mapping the one or more context-based embeddings.

16. A tangible, non-transitory, computer-readable medium comprising instructions that, when executed by processing circuitry, are configured to cause the processing circuitry to:
receive unstructured data associated with one or more production operations performed in an oil and gas production system;
extract information from the unstructured data based on one or more domain specific prompts associated with the oil and gas production system, wherein the information provides intervention key performance indicators (KPIs) and context extracted from intervention reports;
integrate the information with structured data to generate updated structured data, wherein the updated structured data is enhanced with the information and the context by adding the information and the context into the structured data;
receive a request associated with the one or more production operations of the oil and gas production system;
generate a response based on the updated structured data, wherein the response comprises a visualization representative of the response; and
based on the request and the generated response, automatically adjust, with the processing circuitry, one or more operational parameters of one or more devices of the oil and gas production system to control the one or more production operations.

17. The tangible, non-transitory, computer-readable medium of claim 16, wherein the one or more devices include one or more of a valve assembly, a wellhead, a pump, a separation device, seismic survey equipment, drilling equipment, a scraper tool, or a brush tool of the oil and gas production system.

18. The tangible, non-transitory, computer-readable medium of claim 16, wherein the one or more domain specific prompts are based on at least one of a prompt design, an input received via an artificial intelligence design, or an additional input received from a user.

19. The tangible, non-transitory, computer-readable medium of claim 16, wherein the structured data comprises a tabular format.

20. The tangible, non-transitory, computer-readable medium of claim 16, wherein the instructions are configured to cause the processing circuitry to:
convert one or more datasets associated with the structured data and the unstructured data into one or more context-based embeddings based on an artificial intelligence model;
generate a vector database based on the one or more context-based embeddings; and
generate the response based on the vector database.

* * * * *